Patented Nov. 9, 1943

2,333,657

UNITED STATES PATENT OFFICE 2,333,657

ANTIOXIDANT FOR FATS AND OILS

Henry A. Mattill and Calvin Golumbic, Iowa City, Iowa, assignors to Lever Brothers Company, Cambridge, Mass., a corporation of Maine No Drawing. Application May 26, 1942, Serial No. 444,602

19 Claims. (Cl. 99—163)

This invention relates to the preservation or stabilization of oils and fats, and food products containing oils and fats, by retarding the oxidation and the development of rancidity therein; the invention also relates to oils, fats and food products so stabilized and to the materials used therein.

More particularly, the invention concerns the preservation and stabilization of edible oils and fats from animal or vegetable sources, such as a dry plastic shortening made from refined vegetable oil.

It is well known that oils and fats often become rancid, which in the case of edible oils and fats or products containing the same renders them unfit for human consumption. This is particularly true in the case of oils and fats that have been subject to refining or processing operations, or which are stored for an appreciable time before they are used. It is desirable to prevent those changes which result in rancidity, or at least to postpone them to such an extent that the oils and fats may be utilized before any undesirable action takes place.

It is an object of the invention to preserve or stabilize oils and fats and food substances containing the same by the incorporation therein of a relatively small amount of caffeic acid.

It is a further object of the invention to so utilize the caffeic acid alone in animal or vegetable oils and fats, or with other compounds for enhancing the stabilizing action of the caffeic acid.

Caffeic acid occurs in coffee and is a constituent of other natural foods which are normally consumed by humans in relatively large quantities. The incorporation of caffeic acid in edible fats and oils to prevent them from spoilage by rancidity, therefore, can in no sense be considered as the addition of a foreign or undesirable substance. It is an additional advantage of the invention that the stabilization can be accomplished by means of a substance which is without harmful effect.

The fats and oils to which the invention is applicable are those comprising glycerides of fatty acids, particularly unsaturated fatty acids. They may be obtained from the naturally occurring sources, such as animal or vegetable oils and fats or from synthetic sources. Lard, in particular, is an example of a fat from an animal source that has a tendency to turn rancid and is, therefore, improved as to keeping qualities by the addition of an antioxidant. Vegetable oils, such as cottonseed oil, coconut oil, palm oil, sesame oil, soybean oil, peanut oil, sunflowerseed oil, olive oil, etc., are examples of vegetable oils to which an antioxidant may be added. Vegetable oils are generally subjected to refining operations which may remove some naturally occurring antioxidants, but not others, or may reduce them in amount. Shortenings of the dry plastic type comprised of partially hydrogenated refined vegetable oils may also be protected by antioxidants, as well as similar shortenings produced by compounding an oil with a hard fat.

Vegetable and animal oils and fats are known to differ in their response to the presence of various substances which have been proposed as stabilizers or antioxidants. A substance which stabilizes animal fats may be relatively inactive in stabilizing vegetable oils and fats. The converse is also true, i. e., substances which are effective as antioxidants in vegetable fats may be of little or no value when incorporated into animal fats. The exact reason for this is not known, but since many oils and fats contain small amounts of naturally occurring pro-oxidants and antioxidants, it is likely that the over-all antioxidant action results from the combined effects of naturally occurring and added ingredients. This varies in view of the differences in the naturally occurring substances in oils and fats from different sources. It is an additional advantage of the present invention that caffeic acid can be used as a stabilizer for oils and fats of both vegetable and animal origin.

Some of the constituents of oils and fats are well known in chemistry to possess a tendency to absorb and react with oxygen. The development of rancidity results primarily from the products formed during oxidation. The dissolved or absorbed oxygen usually reacts first to form fatty acid peroxides. The development of the peroxides may be accelerated by moisture, heat, light or catalysts. Aldehydes, ketones and acids of lower molecular weight may be formed among others in the further decomposition and these materials impart an undesirable odor and taste to the oil or fat.

The exact action of the caffeic acid as an antioxidant is not fully understood, but the evidence available shows that it delays the accumulation of fatty acid peroxides, whose presence appears to bring about the production of the various oxidation products of oils and fats commonly known as the products of rancidity.

The efficiency of an antioxidant may be expressed in terms of the resistance of an oil or fat to the absorption of oxygen. When an oxidizable oil or fat is exposed to oxygen or air under standardized conditions, a definite time interval elapses before there is an appreciable absorption of oxygen by the oil or fat. This interval is termed the "induction period." It is possible, therefore, to denote the action of an antioxidant in terms of its ability to prolong the induction period. This method has been standardized and can be carried out conveniently by a comparison of the stabilized oil or fat with a control, i. e., an oil or fat not containing an antioxidant but which has been otherwise treated under like conditions. Such a test may be employed in evaluating caffeic acid as an antioxidant, and will be referred to in denoting the extent of its antioxidant action.

As has been mentioned heretofore, some of the products formed in the early stages of the oxidation of oils and fats are fatty acid peroxides, and the extent of the oxidation of an oil or fat can be determined from its peroxide content. Thus the effectiveness of an antioxidant added to suppress or delay oxidation can be denoted in terms of the amount of peroxides formed or their absence. This method has been standardized and the peroxide number of an oil or fat containing an antioxidant, after being exposed to oxygen or air under standardized conditions for a given time, can be expressed in millimols of oxygen and can be used to evaluate the antioxidant action.

While in general it is preferred to indicate the antioxidant efficiency in terms of the induction period, there may be certain instances where a designation in terms of peroxide value will be more advantageous or revealing. The peroxide method of determining and indicating antioxidant efficiency is also employed in designating the results obtained in accordance with the invention.

As illustrative of the invention, caffeic acid was incorporated in lard in the amount shown in the table below and the lard was exposed to oxygen or air at 60° or 70° C. as indicated. The antioxygenic action of the caffeic acid, in terms of induction period, is indicated in the following table:

*Table I*

| Substrate | Amount of caffeic acid | Induction period | |
|---|---|---|---|
| | | With caffeic acid | Control |
| | Percent | | |
| Lard #1 exposed to oxygen at 70° C. | 0.02 | 82 hours | 15 hours. |
| Do | 0.10 | 264+ +¹ hrs. | 15 hours |
| Lard #2 exposed to air at 60° C. | 0.02 | 60+ +¹ days. | 7 days. |

¹ Fresh when discontinued.

Lard containing caffeic acid in the amount shown in the table below was exposed to air as 70° C., and the peroxide content was determined at intervals. The antioxygenic action of caffeic acid, in terms of peroxide value is given in Table II.

*Table II*

| Substrate | Amount of caffeic acid | Peroxide value in millimols of oxygen | | | |
|---|---|---|---|---|---|
| | | 4th day | 11th day | 25th day | 39th day |
| | Percent | | | | |
| Lard | None | 8.4 | 30 | (¹) | (¹) |
| Do | 0.02 | 1.4 | 2 | 3.0 | 3.8 |

¹ Rancid.

As has been mentioned previously, caffeic acid is not only effective by itself, but is effective with other substances which reinforce the inhibitory action of the caffeic acid. This can be called a synergistic effect. A material which can be so used is a chroman type compound selected from the group including the hydroxychromans, such as the 6-hydroxychromans, the $\alpha$-$\beta$-$\gamma$-tocopherols, and the alkyltocols, such as 5,7-dimethyltocol, the hydroxychromans, such as the 6-hydroxychromens and alkyl substituted compounds, the hydroxycoumarans, such as the 5-hydroxycoumarans, and alkyl substituted compounds, the hydroxycoumarones, such as the 5-hydroxycoumarones, the hydroxyisocoumaranones and aromatic and alkyl substituted compounds, such as the 5- and 7-hydroxyisocoumaranones, and the chroman-5,6-quinones and their precursors which are associated with vitamin E.

As illustrative of the use of caffeic acid and one of the above referred to chroman type compounds, caffeic acid and $\alpha$-tocopherol were incorporated in lard in the amounts shown in the table below. The results, in terms of induction period, are shown in the following table:

*Table III*

| Substrate | Antioxidant | Induction period in hours |
|---|---|---|
| Lard | None | 15 |
| Do | 0.02% caffeic acid | 82 |
| Do | 0.02% $\alpha$-tocopherol | 35 |
| Do | 0.02% caffeic acid+0.02% $\alpha$-tocopherol | 215 |

In considering the synergistic effect, it is necessary to keep in mind that certain naturally occurring fats and oils, particularly those from certain vegetable sources, contain a small amount of tocopherol as a natural ingredient.

When tocopherol is to be utilized with caffeic acid for its antioxidant effect in accordance with the invention, it is immaterial whether it is present as a naturally occurring ingredient or whether it is added; the invention contemplates either. In those instances where a tocopherol is naturally present, and in an amount sufficient for the purpose, it would not be necessary to add an additional quantity from an outside source in order to secure the synergistic effect in which it plays a role. In instances where a tocopherol is naturally present but not in a sufficient amount it may be supplemented.

As illustrative of the invention as applied to a fat from a vegetable source containing naturally occurring tocopherol, caffeic acid was incorporated in several samples of a hydrogenated vegetable oil of the dry plastic type. The antioxygenic action is shown in the following tables in terms of induction period and peroxide value.

*Table IV*

| Substrate | Antioxidants | Induction period (average of two samples) |
|---|---|---|
| Hydrogenated vegetable oil #1. | p.1% N. o.¹ tocopherol | 21 |
| Do | 0.1% N. o.¹ tocopherol+0.01% caffeic acid. | 35 |
| Hydrogenated vegetable oil #2. | 0.1% N. o.¹ tocopherol | 27 |
| Do | 0.1% N. o.¹ tocopherol+0.02% caffeic acid. | 50 |

¹ Naturally occurring.

Table V

| Substrate | Antioxidants | Peroxide value in millimols of oxygen | | | | |
|---|---|---|---|---|---|---|
| | | 4th day | 11th day | 18th day | 25th day | 32nd day |
| Hydrogenated vegetable oil. | 0.1% N. o. [1] tocopherol. | 7.3 | 13.2 | 18.8 | 22.3 | 26 |
| Do | 0.1% N. o. [1] tocopherol+0.02% caffeic acid. | 3.2 | 5.6 | 9.1 | 11.3 | 15.6 |

[1] Naturally occurring.

The exact values for these particular fats, not containing the tocopherol, are not available but the general properties of such fats are known and show that the above stabilizing action is attributable to both the caffeic acid and the tocopherol, as has been convincingly demonstrated in the case of lard.

Other materials which act synergistically with caffeic acid are ascorbic, phosphoric and tartaric acids. If these are incorporated with caffeic acid in lard, a reinforcing action is obtained as indicated in the following table:

Table VI

| Substrate | Antioxidant | Induction period in hours |
|---|---|---|
| Lard | None | 30 |
| Do | 0.02% caffeic acid | 105.5 |
| Do | 0.10% ascorbic acid | 40 |
| Do | 0.02% caffeic acid+0.10% ascorbic acid | [1] 240++ |
| Do | 0.02% caffeic acid+0.10% phosphoric acid | [1] 240++ |
| Do | 0.02% caffeic acid +0.10% tartaric acid | [1] 240++ |

[1] Fresh when discontinued.

Phosphoric and tartaric acids are known to have little or no stabilizing action on lard and for this reason determinations were not made on samples containing only these acids.

As illustrative of a synergistic effect obtained with caffeic acid, tocopherol and ascorbic acid, the following results are given in terms of induction period:

Table VII

| Substrate | Antioxidants | Induction period in days |
|---|---|---|
| Hydrogenated vegetable oil. | 0.1% N. o. [1] tocopherol | 19 |
| Do | 0.1% N. o. [1] tocopherol+0.01% caffeic acid. | 31 |
| Do | 0.1% N. o. [1] tocopherol+0.002% ascorbic acid. | 31 |
| Do | 0.1% N. o. [1] tocopherol+0.002% ascorbic acid+0.01% caffeic acid. | 47 |

[1] Naturally occurring.

The amount of caffeic acid used is not particularly critical and relatively small amounts can be used; there is probably no minium of any substantial amount which will not yield some result. The use of more than is necessary would not be economical. For commercial purposes it is probably desirable to have the compounds in the amount of from 0.005% to 0.1%.

The chemistry involved in the use of caffeic acid or its coaction with the other compounds disclosed is not entirely understood. However, having fully disclosed the invention and the manner in which it is practiced it is unnecessary to ascribe to or be limited by any theory of operation.

It will be obvious that our invention contemplates numerous alternative and equivalent embodiments other than those specifically mentioned as illustrative, and all of the same are intended to be included within the invention as claimed hereinafter.

We claim:

1. A composition of matter comprising an oleaginous material in which is included a small amount of caffeic acid.

2. A composition of matter comprising an oleaginous material in which is included a small amount of caffeic acid and a compound selected from the group consisting of hydroxychromans, tocopherols, alkyltocols, hydroxycoumarans, hydroxycoumarones, hydroxyisocoumaranones and the chroman-5,6-quinones and their precursors which are related to vitamin E.

3. A composition of matter comprising an oleaginous material in which is included a small amount of caffeic acid and ascorbic acid.

4. A composition of matter comprising an oleaginous material in which is included a small amount of caffeic acid and tartaric acid.

5. A composition of matter comprising an oleaginous material in which is included a small amount of caffeic acid, ascorbic acid, and a compound selected from the group consisting of hydroxychromans, tocopherols, alkyltocols, hydroxycoumarans, hydroxycoumarones, hydroxyisocoumaranones and the chroman-5,6-quinones and their precursors which are related to vitamin E.

6. A composition of matter comprising a dry, plastic, edible shortening formed from hydrogenated vegetable oil in which is included a small amount of caffeic acid.

7. A composition of matter comprising a dry, plastic, edible shortening formed from hydrogenated vegetable oil in which is included a small amount of caffeic acid and ascorbic acid.

8. A composition of matter comprising a dry, plastic, edible shortening formed from hydrogenated vegetable oil in which is included a small amount of caffeic acid and tartaric acid.

9. A process of inhibiting oxidation and development of rancidity in oleaginous material which comprises adding thereto a small amount of caffeic acid.

10. A process of inhibiting oxidation and development of rancidity in oleaginous material which comprises adding a small amount of caffeic acid and a compound selected from the group consisting of hydroxychromans, tocopherols, alkyltocols, hydroxycoumarans, hydroxycoumarones, hydroxyisocoumaranones and the chroman-5,6-quinones and their precursors which are related to vitamin E.

11. A process of inhibiting oxidation and development of rancidity in oleaginous material containing a naturally occurring tocopherol comprising adding a small amount of caffeic acid.

12. A process of inhibiting oxidation and development of rancidity in oleaginous material which comprises adding a small amount of caffeic acid and ascorbic acid.

13. A process of inhibiting oxidation and the development of rancidity in a dry, plastic, edible shortening formed from hydrogenated vegetable oils which comprises adding thereto a small amount of caffeic acid.

14. A process of inhibiting oxidation and the development of rancidity in a dry, plastic, edible shortening formed from hydrogenated vegetable oils which comprises adding thereto a small amount of caffeic acid and tartaric acid.

15. A composition of matter comprising an oleaginous material in which is included a small amount of caffeic acid and phosphoric acid.

16. A composition of matter comprising a dry, plastic, edible shortening formed from hydrogenated vegetable oil in which is included a small amount of caffeic acid and phosphoric acid.

17. A process of inhibiting oxidation and development of rancidity in oleaginous material which comprises adding a small amount of caffeic acid and phosphoric acid.

18. A composition of matter comprising a dry, plastic, edible shortening formed from hydrogenated vegetable oil in which is included 0.005% to 0.1% of caffeic acid.

19. A process of inhibiting oxidation and the development of rancidity in a dry, plastic, edible shortening formed from hydrogenated vegetable oils which comprises adding thereto 0.005% to 0.1% of caffeic acid.

HENRY A. MATTILL.
CALVIN GOLUMBIC.

---

CERTIFICATE OF CORRECTION.

Patent No. 2,333,657. November 9, 1943.

HENRY A. MATTILL, ET AL.

It is hereby certified that error appears in the printed specification of the above numbered patent requiring correction as follows: Page 2, second column, line 10, for "hydroxychromans" read --hydroxychromens--; and that the said Letters Patent should be read with this correction therein that the same may conform to the record of the case in the Patent Office.

Signed and sealed this 14th day of December, A. D. 1943.

(Seal)

Henry Van Arsdale,
Acting Commissioner of Patents.

CERTIFICATE OF CORRECTION.

Patent No. 2,333,657. November 9, 1943.

HENRY A. MATTILL, ET AL.

It is hereby certified that error appears in the printed specification of the above numbered patent requiring correction as follows: Page 2, second column, line 10, for "hydroxychromans" read --hydroxychromens--; and that the said Letters Patent should be read with this correction therein that the same may conform to the record of the case in the Patent Office.

Signed and sealed this 14th day of December, A. D. 1943.

(Seal)

Henry Van Arsdale,
Acting Commissioner of Patents.